Patented Feb. 4, 1941

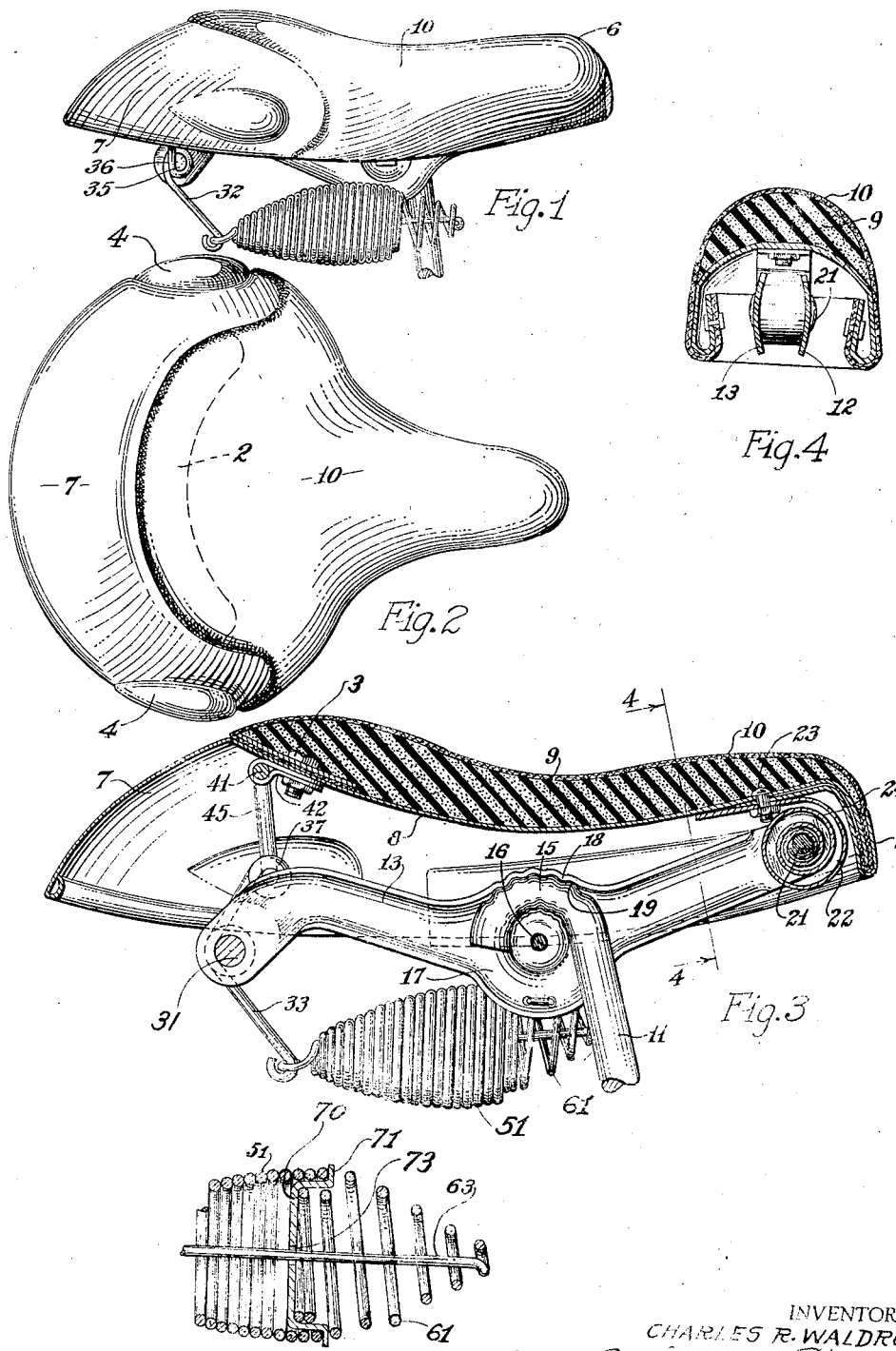

2,230,416

UNITED STATES PATENT OFFICE 2,230,416

BICYCLE SADDLE

Charles R. Waldron, Alma, Mich., assignor, by direct and mesne assignments, to The Faulhaber Company, Monroeville, Ohio, a corporation of Ohio Application February 25, 1937, Serial No. 127,713

10 Claims. (Cl. 155—5.20)

This invention relates to saddle construction and more particularly to a spring saddle or seat for a bicycle, tricycle or the like.

It is among the objects of my invention to provide a saddle which will be simple and durable in construction and which will provide a comfortable yielding support for the user. It is a further object of my invention to provide a saddle supporting assembly in which horizontally disposed springs act through a lever arrangement to provide a soft yielding support for the saddle. It is a further object of my invention to provide a saddle in which horizontally extending tension and compression springs co-operate to resiliently support the seat portion of the saddle. It is a further object of my invention to provide a saddle in which horizontally extending springs are associated with a system of levers so that the magnitude of movement of the seat occasioned by the weight of the user or road shocks varies with respect to the magnitude of movement of the springs. Further objects and advantages relating to simplicity of construction and economies of manufacture will appear from the following description and the appended drawings in which Figure 1 is an elevation of the saddle assembly constructed according to my invention;

Figure 2 is a plan view of the saddle;

Figure 3 is a longitudinal sectional view through the saddle showing the spring assembly;

Figure 4 is a transverse sectional view looking along the line 4—4 of Figure 3;

Figure 5 is a sectional view with parts broken away showing a modified form of spring anchorage;

Figure 6:
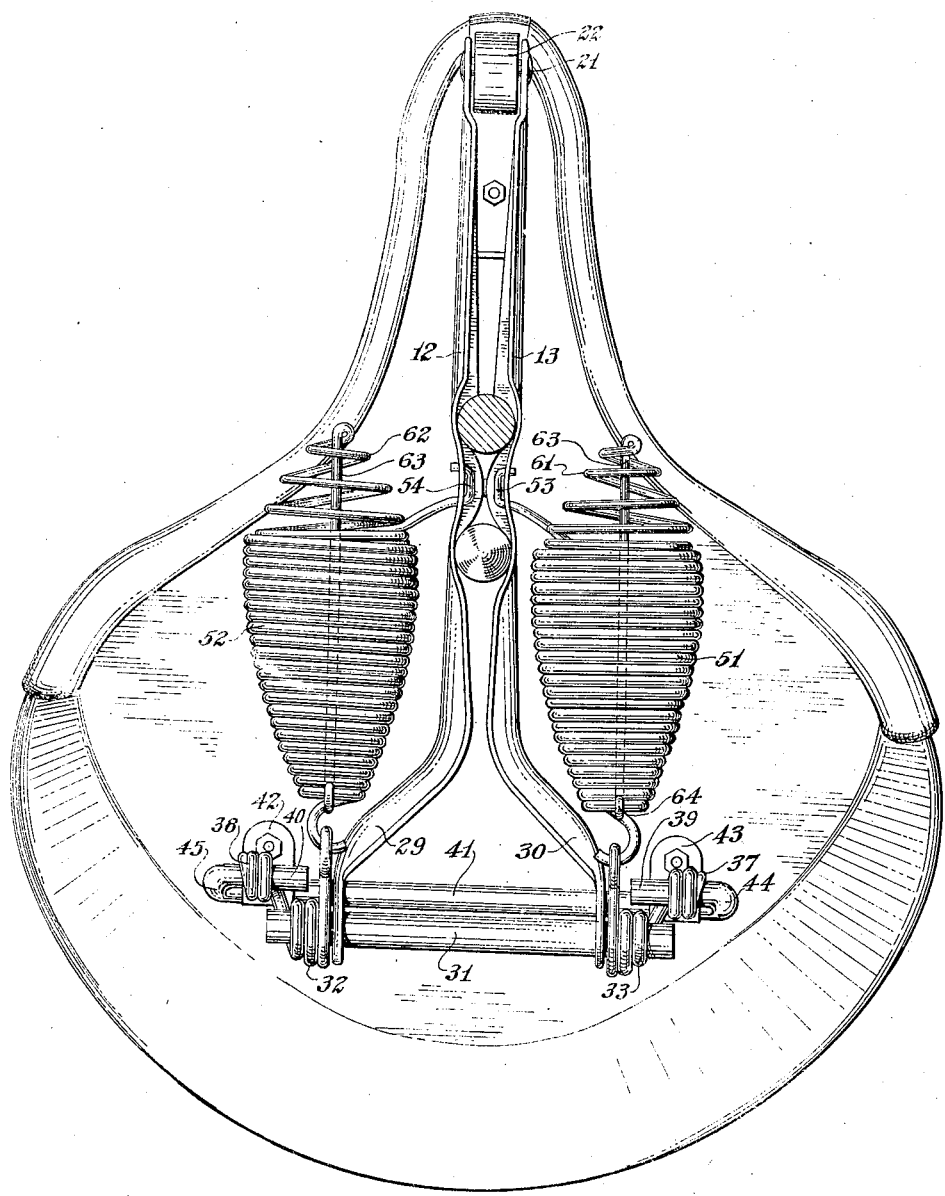
Figure 6 is a plan view of an inverted saddle constructed according to my invention.

Referring to the drawings the saddle assembly indicated in its entirety as at 6 preferably comprises a metal base or seat portion 7 which may be economically stamped or drawn from sheet metal. The base 7 is depressed as at 8 toward the forward end thereof and cushioning material 9 such as, for instance, sponge rubber is molded or shaped to fit the depression 8 and the cushioning material covered with leather as at 10. The covering material 10 may be conveniently secured about the cushioning material 9 and to the base 7 by means of a curved plate 2 which is disposed along the rear edge of the dished portion 8. The fastening means 3 employed to secure the plate 2 and covering material to the seat may also be utilized to retain clips 42 for the spring assembly, more fully described hereinafter. The seat 7 including its cushioning and covering material is yieldably and flexibly supported with respect to the seat post 11 by an assembly including a pair of longitudinally extending reach members 12 and 13 which may be drawn from sheet metal. Preferably the reach members are shaped intermediate their ends adjacent the post 11 as at 17 to embrace the curved upper end 15 of the post and are clamped in position thereon by a bolt or the like as at 16.

The angular adjustment of the saddle with respect to the post 11 and the vehicle to which the saddle is secured may be conveniently obtained by providing the reach members 12 and 13 with a series of reentrant ribs 18 (Figure 3) which are spaced and arranged to co-operate with a series of ribs 19 formed on the supporting post 11. By loosening the bolt 16 the entire saddle assembly may be tilted to the angle desired by the user and secured in said tilted position by drawing up the fastener 16. The reach members 12 and 13 extend substantially parallel to each other forwardly of the saddle post 11 and carry between their forward free ends a transverse pin or the like 21 which in turn carries a flat spiral spring 22. The outer convolution or free end of the spiral spring 22 is arranged to extend beneath the forward end of the seat or base 7 and is anchored to said seat by fastening means 23 to afford a resilient mounting for the forward end of the seat. A metallic clip 24 may conveniently be carried by the fastener 23 and extend forwardly beneath the edge of the seat 7 to grip the leather covering 10 about the edge of the seat as at 25.

To effectively support the wide part of the seat the reach members 12 and 13 are arranged to diverge with respect to the longitudinal axis of the saddle at the free ends thereof disposed beneath the rear of the seat 7 as at 29 and 30 and said diverging end portions are preferably provided with aligned apertures to support a transversely extending pin 31. Pivoted lever or bell crank members 32 and 33 are secured to the pin 31 at the end portions thereof projecting beyond the free ends of the reach members. The members 32 and 33 in the embodiment shown are formed of heavy spring wire and keyed or locked to the pin 31 by wrapping a convolution of the wire over a squared face of the pin as at 35 and 36, which connection will insure that the bell crank levers 32 and 33 rotate in unison with the pin 31. The upper free ends of the bell crank levers 32 and 33 are provided with bearing loops or apertures as at 37 and 38 to receive the inturned ends 39 and 40 respectively of a depending U-shaped bail member 41 having the bight portions of the U conveniently rotatably secured to the seat 7 by the clips 42 and 43.

The depending legs or side members 44 and 45 of the bail 41 extend forwardly from their pivot connection with the seat or base 7 at an angle determined by the angle between the two arms of the bell crank levers 32 and 33 and the arrangement of the springs 51 and 52 secured to the lower arms of the bell cranks 33 and 32 respectively. The springs 51 and 52 are preferably tapered tension wound coil springs and have their ends remote from the bell crank levers anchored to the portion 17 of the reach members as at 53 and 54 respectively. A pair of co-operating tapered wound spiral compression springs 61 and 62 are arranged in alignment with and are supported by the tension springs 51 and 52. The maximum diameter of the compression spring is preferably proportioned with respect to the maximum diameter of the associated tension spring so that the end convolution of each may be locked together by rotating and interwinding the two springs. The end convolution of each of the compression springs has integrally formed therewith or secured thereto an axially extending member 63 which spans the full extent of both springs and is bent as at 64 to engage over the end of the smallest convolution on the compression spring.

An alternative method of supporting the co-operating springs 51—61 and 52—62 is shown in Figure 5 wherein a pressed metal strut 70 is arranged to extend transversely from the longitudinal truss members. The outer free end of the strut 70 is provided with a drawn circular cup having a flange 71 and the end convolution of the spring 61 is arranged against the bottom of the inside of the drawn cup and the end convolution of the spring 51 is supported by the flange 71. The cup may be apertured as at 73 to receive the longitudinally extending member 63 which runs co-axially of the two springs.

In use it will be observed that in a saddle construction such as I have provided the upper arms of the bell crank members are arranged to approach the vertical sides of the arcs through which they swing as weight is imposed on the seat and that as the upper arms of the bell cranks approach the vertical sides of the arcs they acquire a greater leverage or mechanical advantage with respect to the springs. This characteristic permits a wide variation between seat movement and spring deformation. For instance, the springs 51—52 may be relatively soft and be extended one inch whereas the seat moves but half an inch in response to a load. Through a change in leverage this ratio may be reversed. The compression springs and the tension springs being connected to each other and arranged to constantly act in opposition to each other result in a spring support assembly wherein the resilient supporting action is sensitive and yet the spring supporting structure is strong and durable. The manner in which I have supported the seat or base 7 permits the elimination of the usual coil springs incorporated in the base portion and permits the use of a sheet metal seat or base throughout which contributes to the long life of the entire assembly in that the seat 7 consists of a protective housing for the reach, lever and spring assembly therebeneath. Preferably the exposed metal portion of the base 7 is provided with bosses 4 along the outer edges thereof as shown in Figures 1 and 2, which bosses give the saddle a pleasing stream line appearance. The bosses 4 project beyond the outer edge of the saddle and thus protect the saddle 5 from wear occasioned by leaning the bicycle or the like against a support.

Although I have described and shown my invention in considerable detail it will be understood by those skilled in the art that numerous variations and modifications may be made therein without departing from the scope of the invention as defined by the following claims.

I claim:

1. A saddle comprising a sheet metal seat portion, a longitudinally extending reach therebeneath, means to resiliently support said seat with respect to said reach comprising a bell crank lever pivotally mounted on said reach, a link pivotally connected to said seat and to one arm of said lever, and spring means connected to the other arm of said lever and to said reach normally urging said lever in a direction to move said seat away from said reach through relative motion of the first mentioned arm of said lever and said link, and a pivotal connection between said seat and said reach spaced from the pivotal connection of said link to said seat.

2. A saddle construction comprising a rigid saddle post, a reach member having a central portion thereof secured to said post, a seat member resiliently connected to one end of said reach, a depending member pivotally secured to said seat at the other end thereof, a bell crank lever pivoted to said reach and having one arm connected to said member, and a separate spring associated with said reach and the other arm of said lever to normally urge said seat upwardly with respect to said reach about the resilient connection between said seat and the first mentioned end of said reach.

3. A saddle construction comprising a reach having a forwardly extending portion and a rearward diverging portion, a sheet metal seat arranged thereabove having a narrow forward portion resiliently secured to the forward portion of said reach and a wide diverging portion arranged to overhang said diverging reach portion, a pair of laterally spaced bell crank levers pivoted to said diverging reach portion, a pair of co-operating springs secured between an arm of each bell crank and an intermediate reach portion, and means depending from said diverging seat portion pivotally secured to the other arm of each bell crank.

4. A saddle construction comprising a rigid saddle post, a reach member secured to said post at a point intermediate its ends, a seat member resiliently connected to one end of said reach, a depending member pivotally secured to said seat at the other end thereof, a bell crank lever pivoted to said reach and having one arm pivoted to said member, and a spiral wound spring means associated with said reach and the other arm of said lever to normally urge said seat upwardly with respect to said reach.

5. A saddle construction comprising a rigid saddle post, a reach member secured to said post, a seat member resiliently connected to one end of said reach, a depending member pivotally secured to said seat at the other end thereof, a lever pivoted to said reach and to said member, spring means associated with said reach and lever to normally urge said seat upwardly with respect to said reach, said spring means comprising a spirally wound tension spring anchored to said reach at one end and to said lever at the other end, and a spirally wound compression spring secured to said tension spring and arranged in opposition thereto.

6. A saddle construction comprising a pair of spaced longitudinally extending reach members, a seat member having the forward end thereof resiliently connected to the forward end of said reach member, a lever pivoted intermediate the rear end of said reach and seat, a longitudinally extending spring assembly anchored to said reach member and operatively connected to said pivoted lever to urge said seat upwardly with respect to said reach, said spring assembly comprising unequal interwound tension and compression springs acting in opposition to each other.

7. A saddle construction comprising a reach member secured to a rigid seat post, a seat resiliently connected to said reach by a spring and lever assembly including a bell crank lever formed of spring wire pivoted on said reach, a longitudinally extending spring having one end thereof anchored to said reach and the other end secured to an arm of the bell crank to normally urge said seat upwardly away from said reach, said spring wire bell crank and said longitudinally extending spring proportioned with respect to each other and the loads to which the seat is subjected so that the longitudinally extending spring flexes in response to light loads or loads initially applied and said spring wire bell crank flexes in response to heavy loads or loads applied subsequent to maximum deformation of said longitudinally extending spring.

8. A combined tension and compression spring for a saddle comprising a spirally wound tension spring, a cup carried by the tension spring, a spirally wound compression spring having one end disposed in said cup and supported by one end of said tension spring and a connecting member extending through said springs and connecting the other end of said compression spring to the end convolution of the other end of said tension spring.

9. A saddle construction comprising a reach member, a seat member having its forward end supported by said reach member, means connecting the rear end of said seat to the other end of said reach member including a pivoted lever, a longitudinally extending spring assembly anchored to said reach and operatively connected to said pivoted lever to urge said seat upwardly with respect to said reach, said spring assembly comprising a tension spring having one end connected to said lever and the other end connected to said reach and a compression spring supported against and extended beyond said last mentioned end of said tension spring and means connecting the free end of said compression spring to said first mentioned end of said tension spring.

10. A saddle construction comprising a reach member, a seat member having its forward end supported by said reach member, means connecting the rear end of said seat to the other end of said reach member including a pivoted lever, a longitudinally extending spring assembly anchored to said reach and operatively connected to said pivoted lever to urge said seat upwardly with respect to said reach, said spring assembly comprising a tension spring having one end connected to said lever and the other end connected to said reach and a compression spring supported against and extended beyond said last mentioned end of said tension spring, and an integral extension from the free end of said compression spring extending through said springs and hooked to the first mentioned end of said tension spring.

CHARLES R. WALDRON.